(12) United States Patent
Finnerty et al.

(10) Patent No.: US 10,858,247 B2
(45) Date of Patent: Dec. 8, 2020

(54) MULTI-TUBULAR CHEMICAL REACTOR WITH IGNITER FOR INITIATION OF GAS PHASE EXOTHERMIC REACTIONS

(71) Applicant: Watt Fuel Cell Corp., Mount Pleasant, PA (US)

(72) Inventors: Caine M. Finnerty, Mount Pleasant, PA (US); Paul DeWald, Scottdale, PA (US)

(73) Assignee: Watt Fuel Cell Corp., Mount Pleasant, PA (US)

( * ) Notice: Subject to any disclaimer, the term of this patent is extended or adjusted under 35 U.S.C. 154(b) by 0 days.

(21) Appl. No.: 16/515,608

(22) Filed: Jul. 18, 2019

(65) Prior Publication Data

US 2019/0375634 A1    Dec. 12, 2019

Related U.S. Application Data

(62) Division of application No. 15/033,997, filed as application No. PCT/US2014/064238 on Nov. 6, 2014, now Pat. No. 10,414,650.

(Continued)

(51) Int. Cl.
*C01B 3/38* (2006.01)
*B01J 12/00* (2006.01)
(Continued)

(52) U.S. Cl.
CPC .............. *C01B 3/386* (2013.01); *B01J 4/001* (2013.01); *B01J 4/002* (2013.01); *B01J 4/005* (2013.01); *B01J 7/00* (2013.01); *B01J 8/0285* (2013.01); *B01J 8/065* (2013.01); *B01J 8/067* (2013.01); *B01J 8/1836* (2013.01); *B01J 8/24* (2013.01); *B01J 12/005* (2013.01); *B01J 12/007* (2013.01); *B01J 19/0013* (2013.01); *B01J 19/0093* (2013.01); *B01J 19/2415* (2013.01); *B01J 19/2445* (2013.01); *B01J 2208/00389* (2013.01); *B01J 2208/00902* (2013.01); *B01J 2208/00911* (2013.01); *B01J 2219/002* (2013.01); *B01J 2219/00006* (2013.01); *B01J 2219/00058* (2013.01); *B01J 2219/00063* (2013.01);

(58) Field of Classification Search
CPC ........................................................ B01J 7/00
See application file for complete search history.

(56) References Cited

U.S. PATENT DOCUMENTS 2,945,077 A    7/1960 Polk
3,518,284 A    6/1970 Foster
(Continued)

FOREIGN PATENT DOCUMENTS

EP    1382382 A1    1/2004
EP    1787950 A2    5/2007
(Continued)

OTHER PUBLICATIONS

C. Finnerty, K. Kendall, G. A. Tompsett, Integrated Catalytic Burner/Micro-SOFC Design and Applications Electrochemistry, 68 (2) (2000) 519-521.
(Continued)

*Primary Examiner* — Matthew J Merkling
(74) *Attorney, Agent, or Firm* — Dilworth & Barrese, LLP

(57) ABSTRACT

A multi-tubular chemical reactor includes an igniter for the initiation of gas phase exothermic reaction within the gas phase reaction zones of the tubular reactor units.

16 Claims, 8 Drawing Sheets

Related U.S. Application Data

(60) Provisional application No. 61/900,510, filed on Nov. 6, 2013, provisional application No. 61/900,543, filed on Nov. 6, 2013.

(51) Int. Cl.
*B01J 4/00* (2006.01)
*B01J 8/06* (2006.01)
*B01J 8/02* (2006.01)
*B01J 8/18* (2006.01)
*B01J 8/24* (2006.01)
*B01J 19/00* (2006.01)
*B01J 19/24* (2006.01)
*B01J 7/00* (2006.01)

(52) U.S. Cl.
CPC ........ *B01J 2219/00069* (2013.01); *B01J 2219/00117* (2013.01); *B01J 2219/00132* (2013.01); *B01J 2219/00135* (2013.01); *B01J 2219/00155* (2013.01); *B01J 2219/00157* (2013.01); *B01J 2219/00159* (2013.01); *B01J 2219/00213* (2013.01); *B01J 2219/00234* (2013.01); *B01J 2219/00585* (2013.01); *C01B 2203/0233* (2013.01); *C01B 2203/0244* (2013.01); *C01B 2203/0261* (2013.01); *C01B 2203/085* (2013.01); *C01B 2203/0844* (2013.01); *C01B 2203/1223* (2013.01); *C01B 2203/1229* (2013.01); *C01B 2203/1235* (2013.01); *C01B 2203/1241* (2013.01); *C01B 2203/1247* (2013.01); *C01B 2203/141* (2013.01)

(56) References Cited

U.S. PATENT DOCUMENTS

| | | |
|---|---|---|
| 3,560,167 A | 2/1971 | Bruckner et al. |
| 4,588,659 A | 5/1986 | Abens et al. |
| 4,751,057 A | 6/1988 | Westerman |
| 4,894,205 A | 1/1990 | Westerman et al. |
| 5,149,156 A | 9/1992 | Kleefeldt |
| 5,149,516 A | 9/1992 | Han et al. |
| 5,447,705 A | 9/1995 | Petit et al. |
| 5,527,631 A | 6/1996 | Singh et al. |
| 5,573,737 A | 11/1996 | Uthamalingam Balachandrean et al. |
| 5,596,514 A | 1/1997 | Maher, Jr. et al. |
| 5,648,582 A | 7/1997 | Schmidt et al. |
| 5,690,763 A | 11/1997 | Ashmead et al. |
| 6,033,793 A | 3/2000 | Woods et al. |
| 6,284,398 B1 | 9/2001 | Kiryu |
| 6,296,814 B1 | 10/2001 | Bonk et al. |
| 6,379,586 B1 | 4/2002 | Zeng et al. |
| 6,383,469 B1 | 5/2002 | Lamla et al. |
| 6,383,670 B1 | 5/2002 | Edlund et al. |
| 6,402,989 B1 | 6/2002 | Gaffney |
| 6,403,049 B1 | 6/2002 | Van Keulen et al. |
| 6,447,940 B1 | 9/2002 | Ueda |
| 6,458,334 B1 | 10/2002 | Tamhankar et al. |
| 6,465,118 B1 | 10/2002 | Dickman et al. |
| 6,488,838 B1 | 12/2002 | Tonkovich et al. |
| 6,488,907 B1 | 12/2002 | Barnes et al. |
| 6,492,050 B1 | 12/2002 | Sammes |
| 6,521,204 B1 | 2/2003 | Borup et al. |
| 6,565,817 B1 | 5/2003 | Kiryu |
| 6,576,359 B2 | 6/2003 | Fronk |
| 6,585,940 B2 | 7/2003 | Abe et al. |
| 6,641,625 B1 | 11/2003 | Clawson et al. |
| 6,641,795 B2 | 11/2003 | Abe |
| 6,656,623 B2 | 12/2003 | Holmes et al. |
| 6,667,123 B2 | 12/2003 | Yu |
| 6,673,270 B1 | 1/2004 | De Jong et al. |
| 6,692,707 B1 | 2/2004 | Hirabayashi |
| 6,699,609 B2 | 3/2004 | Kotani et al. |
| 6,702,960 B1 | 3/2004 | Schaddenhorst et al. |
| 6,726,853 B2 | 4/2004 | Okado et al. |
| 6,749,958 B2 | 6/2004 | Pastula et al. |
| 6,770,106 B1 | 8/2004 | Okamoto et al. |
| 6,783,742 B2 | 8/2004 | Bentley et al. |
| 6,790,247 B2 | 9/2004 | Childress et al. |
| 6,790,431 B2 | 9/2004 | Wang et al. |
| 6,800,387 B2 | 10/2004 | Shimada et al. |
| 6,833,208 B2 | 12/2004 | Kotani et al. |
| 6,833,536 B2 | 12/2004 | Shigeura |
| 6,869,456 B2 | 3/2005 | Salemi et al. |
| 6,872,379 B2 | 3/2005 | Zahringer et al. |
| 6,878,667 B2 | 4/2005 | Gaffney et al. |
| 6,881,508 B2 | 4/2005 | Penev |
| 6,887,436 B1 | 5/2005 | Fisher et al. |
| 6,887,456 B2 | 5/2005 | Xu et al. |
| 6,921,596 B2 | 7/2005 | Kelly et al. |
| 6,932,950 B1 | 8/2005 | Guetlhuber |
| 6,984,371 B2 | 1/2006 | Zhao et al. |
| 7,001,867 B2 | 2/2006 | Jin et al. |
| 7,037,349 B2 | 3/2006 | Dauer et al. |
| 7,048,897 B1 | 5/2006 | Koripella et al. |
| 7,070,633 B2 | 7/2006 | Okada et al. |
| 7,070,752 B2 | 7/2006 | Zeng et al. |
| 7,132,184 B2 | 7/2006 | Ogino et al. |
| 7,090,826 B2 | 8/2006 | Jiang et al. |
| 7,101,531 B2 | 9/2006 | Kamijo |
| 7,115,233 B2 | 10/2006 | Okada et al. |
| 7,118,717 B2 | 10/2006 | Shore |
| 7,147,836 B2 | 12/2006 | Ebert et al. |
| 7,147,946 B2 | 12/2006 | Kawasumi et al. |
| 7,156,866 B1 | 1/2007 | Nakamura et al. |
| 7,189,371 B2 | 3/2007 | Iwasaki |
| 7,192,458 B1 | 3/2007 | Harness et al. |
| 7,232,352 B2 | 6/2007 | Splaine |
| 7,247,258 B2 | 7/2007 | Jung et al. |
| 7,285,247 B2 | 10/2007 | Smaling et al. |
| 7,294,421 B2 | 11/2007 | Noetzel et al. |
| 7,323,148 B2 | 1/2008 | Shah et al. |
| 7,328,691 B2 | 2/2008 | Hataura et al. |
| 7,335,432 B2 | 2/2008 | Koripella |
| 7,344,572 B2 | 3/2008 | Yamamoto |
| 7,344,687 B2 | 3/2008 | Oi et al. |
| 7,364,812 B2 | 4/2008 | Taylor et al. |
| 7,368,482 B2 | 5/2008 | Basini et al. |
| 7,422,810 B2 | 9/2008 | Venkatamaran et al. |
| 7,490,580 B2 | 2/2009 | Hanai et al. |
| 7,578,861 B2 | 8/2009 | Kah et al. |
| 7,585,810 B2 | 9/2009 | Chen et al. |
| 7,625,414 B2 | 12/2009 | Nougier et al. |
| 7,632,320 B2 | 12/2009 | Tonkovich et al. |
| 7,691,509 B2 | 4/2010 | Han et al. |
| 7,704,618 B2 | 4/2010 | Venkatamaran et al. |
| 7,736,399 B2 | 6/2010 | Ravenda et al. |
| 7,846,599 B2 | 12/2010 | Ballantine et al. |
| 7,858,214 B2 | 12/2010 | Kelly et al. |
| 7,888,278 B2 | 2/2011 | Rapier et al. |
| 7,901,814 B2 | 3/2011 | Venkatamaran et al. |
| 7,976,787 B2 | 7/2011 | England et al. |
| 7,985,506 B2 | 7/2011 | Lee et al. |
| 7,985,509 B2 | 7/2011 | Kim et al. |
| 7,998,456 B2 | 10/2011 | Van Dijk et al. |
| 8,034,504 B2 | 10/2011 | Tsunoda et al. |
| 8,062,800 B2 | 11/2011 | Cho et al. |
| 8,142,941 B2 | 3/2012 | Bitoh |
| 8,158,289 B2 | 4/2012 | Cutright et al. |
| 8,173,310 B2 | 5/2012 | Son |
| 8,241,600 B1 | 8/2012 | Berry et al. |
| 8,257,669 B2 | 9/2012 | Jankowski |
| 8,277,524 B2 | 10/2012 | Keegan et al. |
| 8,298,711 B2 | 10/2012 | Yanase et al. |
| 8,304,122 B2 | 11/2012 | Pushusta et al. |
| 8,318,363 B2 | 11/2012 | Lim |
| 8,323,365 B2 | 12/2012 | Drnevich et al. |
| 8,337,757 B2 | 12/2012 | Roychoudhury et al. |
| 8,354,083 B2 | 1/2013 | Amsden et al. |
| 8,486,162 B2 | 7/2013 | Kim et al. |
| 8,557,451 B2 | 10/2013 | Edlund et al. |

(56) References Cited

U.S. PATENT DOCUMENTS

| | | |
|---|---|---|
| 2003/0054215 A1 | 3/2003 | Doshi et al. |
| 2003/0064259 A1 | 4/2003 | Gittleman |
| 2003/0188486 A1 | 10/2003 | Tanaka et al. |
| 2003/0211021 A1 | 11/2003 | Oi et al. |
| 2003/0211373 A1 | 11/2003 | Ueda et al. |
| 2003/0218991 A1 | 11/2003 | Besecker et al. |
| 2003/0234455 A1 | 12/2003 | Mieney et al. |
| 2003/0235726 A1 | 12/2003 | Kelly et al. |
| 2004/0009104 A1 | 1/2004 | Kaupert et al. |
| 2004/0076562 A1 | 4/2004 | Manzanec et al. |
| 2004/0144030 A1 | 7/2004 | Smaling |
| 2004/0180247 A1 | 9/2004 | Higashiyama et al. |
| 2004/0191591 A1 | 9/2004 | Yamamoto |
| 2005/0008907 A1 | 1/2005 | Isozaki et al. |
| 2005/0028445 A1 | 2/2005 | Roychoudhury et al. |
| 2005/0069485 A1 | 3/2005 | Jung et al. |
| 2005/0081444 A1 | 4/2005 | Anumakonda et al. |
| 2005/0164046 A1 | 7/2005 | Fujihara et al. |
| 2005/0188615 A1 | 9/2005 | Sennoun |
| 2005/0191533 A1 | 9/2005 | Kim et al. |
| 2005/0267606 A1 | 12/2005 | Barlett, Jr. et al. |
| 2006/0051634 A1 | 3/2006 | DeVries |
| 2006/0067861 A1 | 3/2006 | Tonkovich et al. |
| 2006/0133976 A1 | 6/2006 | Male et al. |
| 2006/0179717 A1 | 8/2006 | LaBarge |
| 2006/0246333 A1 | 11/2006 | Schaevitz et al. |
| 2007/0084118 A1 | 4/2007 | Kaeding et al. |
| 2007/0104641 A1 | 5/2007 | Ahmed |
| 2007/0107307 A1 | 5/2007 | Kirwan |
| 2007/0183949 A1 | 8/2007 | Fischer |
| 2007/0289215 A1 | 12/2007 | Hemmings et al. |
| 2008/0138273 A1 | 6/2008 | Jiang |
| 2008/0152970 A1 | 6/2008 | Rush et al. |
| 2008/0187797 A1 | 8/2008 | Edlund |
| 2009/0029205 A1 | 1/2009 | Venkatamaran et al. |
| 2009/0104482 A1 | 4/2009 | Miyazaki |
| 2009/0208784 A1 | 8/2009 | Perry et al. |
| 2009/0291335 A1 | 11/2009 | Anzai |
| 2010/0015479 A1 | 1/2010 | Rusch et al. |
| 2010/0062292 A1 | 3/2010 | Lin et al. |
| 2010/0119894 A1 | 5/2010 | Ishida |
| 2010/0203404 A1 | 8/2010 | Miyazaki |
| 2010/0330446 A1 | 12/2010 | Lucka et al. |
| 2011/0039175 A1 | 2/2011 | Yokoyama et al. |
| 2011/0165483 A1 | 7/2011 | Yamamoto et al. |
| 2011/0189578 A1 | 8/2011 | Crumm et al. |
| 2011/0223549 A1 | 9/2011 | Cantu |
| 2011/0269032 A1 | 11/2011 | Fischer et al. |
| 2012/0062166 A1 | 3/2012 | Thornton et al. |
| 2012/0088167 A1 | 4/2012 | Reiners et al. |
| 2012/0164547 A1 | 6/2012 | Weingaertner et al. |
| 2012/0328969 A1 | 12/2012 | Dewald et al. |
| 2013/0028815 A1 | 1/2013 | Basini et al. |
| 2013/0056911 A1 | 3/2013 | Finnerty et al. |
| 2013/0059223 A1 | 3/2013 | Finnerty et al. |
| 2013/0230787 A1 | 9/2013 | Finnerty et al. |
| 2014/0079626 A1 | 3/2014 | Ji |
| 2014/0335463 A1 | 11/2014 | Friedrich et al. |

FOREIGN PATENT DOCUMENTS

| | | |
|---|---|---|
| GB | 1314984 | 4/1973 |
| GB | 1314984 A | 4/1973 |
| JP | 2005-285340 A | 10/2005 |
| JP | 2008-7372 A | 1/2008 |
| WO | 9841394 A1 | 9/1998 |
| WO | 02099917 A2 | 12/2002 |
| WO | 2004/091771 A1 | 10/2004 |
| WO | 2006032644 A1 | 3/2006 |
| WO | 2006034868 A1 | 4/2006 |
| WO | 2008031024 A1 | 3/2008 |
| WO | 2009116977 A2 | 9/2009 |
| WO | 2011019825 A2 | 2/2011 |

OTHER PUBLICATIONS

K. Kendall, C. Finnerty, G.A. Tompsett, P. Windibank, and N. Coe, "Rapid Heating SOFC System for Hybrid Applications." Electrochemistry, vol. 68, No. 6, (2000) 403.

Finnerty C., Cunningham R.H., Ormerod R.M, "Development of a novel test system for in situ catalytic, electrocatalytic and electrochemical studies of internal fuel reforming in solid oxide fuel cells." Catalysis letters, vol. 66, No. 4, (2000) 221-226(6).

C. Finnerty, N. J. Coe, R.H. Cunningham and R.M. Ormerod, "Steam Reforming and Partial Oxidation of Methane over nickel/zirconia and doped nickel/zirconia anodes in working solid oxide fuel cells." Catalysis Today, in press (1998).

C. Finnerty, R.H. Cunningham and R.M. Ormerod, "Development of more tolerant nickel/zirconia anodes for solid oxide fuel cells running on natural gas." Proc. 3rd Eur. Conf. on SOFCs, 1998, 217-226.

C. Finnerty, R.H. Cunningham and R.M. Ormerod, "Combined Electrochemical and Catalytic studies of anodes in working solid oxide fuel cells" Proc. 3rd Eur. Conf. on SOFCs, 1998, 227-236.

C. Finnerty, R.H. Cunningham and R.M. Ormerod, "Study of the Catalysis and Surface Chemistry occurring at nickel/zirconia anodes in solid oxide fuel cells running on natural gas." Radiation Effects and Defects in Solids [ISSN 1042-0150]. vol. 151 pp. 77-82.

C. Finnerty, R.H. Cunningham, K. Kendall and R.M. Ormerod, "A novel test system for in situ catalytic and electrochemical measurements on fuel processing anodes in working solid oxide fuel cells." J. Chem. Soc. Chem. Comm., (1998) 915.

R.H. Cunningham, C. Finnerty, K. Kendall and R.M. Ormerod, "An in situ catalytic and electrochemical study of working nickel/zirconia anodes in tubular Solid Oxide Fuel Cells." Proc. 5th Int. Symp. on SOFCs, The Electrochem. Soc., 1997, 965-972.

R.H. Cunningham, C. Finnerty and R.M. Ormerod, "Study of Surface Carbon formed on working anodes of Solid Oxide Fuel Cells running on methane" Proc. 5th Int. Symp. on SOFCs, The Electrochem. Soc., 1997, 973-981.

Finnerty C, Cunningham RH, Ormerod RM, "Development of a novel solid oxide fuel cell system based on a tubular zirconia reactor." Radiaton Effects and Defects in Solids [ISSN 1042-0150]. vol. 151 pp. 71-76.

Finnerty, Caine, and David Coimbra, "Solid oxide fuel cells with novel internal geometry." U.S. Pat. No. 6,998,187. Feb. 14, 2006.

Finnerty C, Alston T, Ormerod RM, Kendall K, "A Solid Oxide Fuel Cell Demonstration Kit, Operated on Butane/Propane Portable Fuel Cells" Jun. 1999. ISBN 3-905592-3-7, Edited by F N Buchi, European Fuel Cell Forum.

Finnerty C, Cunningham RH, Ormerod RM, "In situ catalytic, electrocatalytic and electrochemical studies of fuel processing anodes in solid oxide fuel cells running on natural gas." Proceedings of 12th International Conference on Solid-state Ionics, Halkidiki, Greece Jun. 1999. International Society for Solid-state Ionics.

Finnerty C, Cunningham RH, Ormerod RM, "Internal reforming over Nickel/Zirconia Anodes in SOFCs: Influence of anode formulation, pre-treatment and operating conditions." Solid Oxide Fuel Cells VI Oct. 1999. 1999, Edited by S.C Singhal and M. Dokiya, Published by The Electrochemical Society, ISBN 1-56677-242-7.

Finnerty C, Ormerod RM, "Internal reforming and electrochemical performance studies of Doped Nickel/Zirconia anodes in SOFCs running on methane." Solid Oxide Fuel Cells VI, Oct. 1999. 1999, Edited by S.C Singhal and M. Dokiya, Published by The Electrochemical Society, ISBN 1-56677-242-7.

Caine Finnerty, Geoff. A. Tompsett, Kevin Kendall and R. Mark Ormerod, "SOFC system with integrated catalytic fuel processing." Journal of Power Sources, vol. 86, Issues 1-2, Mar. 2000, pp. 459-463.

Caine Finnerty, Neil J. Coe, Robert H. Cunningham and R. Mark Ormerod, "Carbon formation on and deactivation of nickel-based/zirconia anodes in solid oxide fuel cells running on methane." Catalysis Today, vol. 46, Issues 2-3, Nov. 16, 1998, pp. 137-145.

K. Kendall, C. Finnerty, G. Saunders and J. T. Chung, "Effects of dilution on methane entering an SOFC anode" Journal of Power Sources, vol. 106, Issues 1-2, Apr. 1, 2002, pp. 323-327.

(56) References Cited

OTHER PUBLICATIONS

G. A. Tompsett, C. Finnerty, K. Kendall, T. Alston and N. M. Sammes, "Novel applications for micro-SOFCs." Journal of Power Sources, vol. 86, Issues 1-2, Mar. 2000, pp. 376-382.

Caine Finnerty and R. Mark Ormerod, "Internal reforming over nickel/zirconia anodes in SOFCS oparating on methane: influence of anode formulation, pre-treatment and operating conditions." Journal of Power Sources, vol. 86, Issues 1-2, Mar. 2000, pp. 390-394.

C. Finnerty, T. Alston, K. Kendall and R.M. Ormerod, "Development of a small portable SOFC system with integrated catalytic fuel processing." Sixth Grove Fuel Cell Symposium, Sep. 1999, 125.

C. Finnerty, K. Kendall, J. C. Austin, T. Alston ,"Ceramic fuel cells to replace metal burners." Journal of Material science, 36, (2001) 1119-1124.

Ormerod RM, Finnerty CM, Cunningham RH, "In situ catalytic and electrocatalytic studies of internal fuel reforming in solid oxide fuel cells running on natural gas." Studies in Surface Science and Catalysis, Elsevier, [ISBN 0-444-50480-X]. 7 pp. 425-431.

P.K. Cheekatamarla, C.M. Finnerty et al., "Highly Efficient Next-Generation Tubular Solid Oxide Fuel Cells Powered by Readily Available Hydrocarbon Fuels", To be submitted to Nature, 2008.

P.K. Cheekatamarla, C. M. Finnerty, "Synthesis gas generation via partial oxidation reforming of liquid fuels." Accepted for publication, International Journal of Hydrogen Energy, 2008.

Y. Du, C. Finnerty, and J. Jiang, "Thermal Stability of Portable Microtubular SOFCs and Stacks." In press, Journal of the Electrochemical Society, 155(9), 1-XXXX, (2008).

Y. Du, C. Finnerty, and J. Jiang, "Thermal Stability of Portable Micro-Tubular Solid Oxide Fuel Cell and Stack" ECS Trans. 12, (1) 363 (2008).

P.K. Cheekatamarla, C.M. Finnerty , Jun Cai, "Internal reforming of hydrocarbon fuels in tubular solid oxide fuel cells." International Journal of Hydrogen Energy, vol. 33, Issue 7, Apr. 2008, pp. 1853-1858.

Praveen K. Cheekatamarla, C.M. Finnerty, "Reforming catalysts for hydrogen generation in fuel cell applications." Journal of Power Sources, vol. 160, Issue 1, Sep. 29, 2006, pp. 490-499.

P.K. Cheekatamarla, C.M. Finnerty, "Hydrogen Generation via partial oxidation reforming of liquid fuels." Prepr. Pap.-Am. hem. Soc., Div. Fuel Chem. 2007, 52 (2), 288.

P.K. Cheekatamarla, C.M. Finnerty , Jun Cai, "Internal reforming of hydrocarbon fuels in tubular solid oxide fuel cells." ECS Trans. 12, (1) 439 (2008).

P. K. Cheekatamarla, C. M. Finnerty, A. Stanley, C. Robinson, P. Dewald, Y. Lu, Y. Du, "Performance Characteristics of an Integrated Portable JP8 SOFC—Reformer System." ECS Transactions vol. 5, Mar. 2007.

C.M. Finnerty, Y. Du, P.K. Cheekatamarla, B.J. Emley, W. Zhu, J. Cai, R. Sharp, "Geometric Effects on Tubular Solid Oxide Fuel Cells." ECS Transactions—Solid Oxide Fuel Cells, vol. 7, Jun. 2007.

C. Finnerty, C. Robinson, S. Andrews, Y. Du, P. Cheekatamarla, P. Dewald, Y. Lu, T. Schwartz, "Portable Propane Micro-Tubular SOFC System Development." ECS Transactions—Solid Oxide Fuel Cells, vol. 7, Jun. 2007.

D. Bhattacharya, R. Rengaswamy and C. Finnerty, "Isothermal Models for Tubular Anode Supported Solid Oxide Fuel Cell", Chemical Engineering Science, 62(16), pp. 4250-4267, 2007.

D. Bhattacharya, R. Rengaswamy and C. Finnerty, "Dynamic Simulation and Analysis of a Solid Oxide Fuel Cell", in the proceedings of ESCAPE-17, Bucharest, 2007.

Debangsu Bhattacharya, Raghunathan Rengaswamy and Caine Finnerty, "Validation of a Phenomenological Steady-State Model for Solid Oxide Fuel Cell (SOFC)", presented at the Annual AIChE meeting, San Francisco, 2006.

Debangsu Bhattacharya, Raghunathan Rengaswamy and Caine Finnerty, "A Twodimensional Dynamic Model for Tubular Solid Oxide Fuel Cell", presented at the Annual AIChE meeting, San Francisco, 2006.

Debangsu Bhattacharya, Raghunathan Rengaswamy and Caine Finnerty, "Optimization Studies on Anode-Supported Tubular Solid Oxide Fuel Cells", presented at the Annual AIChE Meeting, Salt Lake City, 2007.

Debangsu Bhattacharya, Raghunathan Rengaswamy and Caine Finnerty, "Dynamics and Volterra-Model Based Control of a Tubular Solid Oxide Fuel Cell", presented at the Annual AIChE Meeting, Salt Lake City, 2007.

Debangsu Bhattacharya, Raghunathan Rengaswamy and Caine Finnerty, "Identification and Control of a Tubular Solid Oxide Fuel Cell ( SOFC)", presented at the Annual AIChE meeting, Philadelphia, 2008.

Praveen K. Cheekatamarla, Caine M. Finnerty, Yanhai Du, Juan Jiang, Jian Dong, P.G. Dewald, C. R. Robinson, Advanced tubular solid oxide fuel cells with high efficiency for internal reforming of hydrocarbon fuels Original Research Article; Journal of Power Sources, vol. 188, Issue 2, Mar. 15, 2009, pp. 521-526.

Praveen K. Cheekatamarla, Caine M. Finnerty, Charles R. Robinson, Stanley M. Andrews, Jonathan A. Brodie, Y. Lu, Paul G. Dewald, "Design, integration and demonstration of a 50 W JP8/kerosene fueled portable SOFC power generator", Original Research Article Journal of Power Sources, vol. 193, Issue 2, Sep. 5, 2009, pp. 797-803.

Debangsu Bhattacharyya, Raghunathan Rengaswamy, Caine Finnerty, "Dynamic modeling and validation studies of a tubular solid oxide fuel cell." Original Research Article Chemical Engineering Science, vol. 64, Issue 9, May 1, 2009, pp. 2158-2172.

Zuo, Chendong et al. "Advanced Anode-supported Micro-tubular SOFC Development." ECS Transactions 17.1 (2009): 103-110.

Finnerty, Caine, and David Coimbra, "Anode-supported solid oxide fuel cells using a cermet electrolyte." U.S. Pat. No. 7,498,095. Mar. 3, 2009.

Finnerty, Caine M. "The catalysis and electrical performance of nickel-based/zirconia fuel reforming anodes in solid oxide fuel cells running on methane." Diss. University of Keele, 1998.

Khaligh, Alireza, et al. "Digital control of an isolated active hybrid fuel cell/Li-ion battery power supply." IEEE Transactions on Vehicular technology 56.6 (2007): 3709-3721.

Lankin, Michael, Yanhai Du, and Caine Finnerty, "A review of the implications of silica in solid oxide fuel cells." Journal of Fuel Cell Science and Technology 8.5 (2011): 054001.

MULTI-TUBULAR CHEMICAL REACTOR WITH IGNITER FOR INITIATION OF GAS PHASE EXOTHERMIC REACTIONS

CROSS REFERENCE TO RELATED APPLICATION

This application is a Division of and claims priority to prior application Ser. No. 15/033,997, filed May 3, 2016 and claims priority to PCT/US2014/064238, filed Nov. 6, 2014, and also claims the benefit of U.S. patent application Ser. Nos. 61/900,510 and 61/900,543, both filed Nov. 6, 2013. The entire contents of each of these applications are incorporated by reference herein.

BACKGROUND OF THE INVENTION

The present disclosure relates to chemical reactors and, more particularly, to multi-tubular chemical reactors incorporating igniters for initiation of gas phase exothermic reactions therein.

The teachings of the present disclosure, while generally applicable to multi-tubular reactors of all types for conducting all manner of gas phase exothermic reactions, will be specifically exemplified herein by multi-tubular reformers and methods of operating such reformers to bring about the gas phase exothermic reforming of liquid and gaseous reformable fuels to produce hydrogen-rich reformates.

The conversion of a gaseous or vaporized liquid reformable fuel to a hydrogen-rich carbon monoxide-containing gas mixture, a product commonly referred to as "synthesis gas" or "syngas," can be carried out in accordance with any of such well known gas phase fuel reforming operations as steam reforming, dry reforming, autothermal reforming and catalytic partial oxidation (CPOX) reforming. Each of these fuel reforming operations has its distinctive chemistry and requirements and each is marked by its advantages and disadvantages relative to the others.

The development of improved fuel reformers, fuel reformer components, and reforming processes continues to be the focus of considerable research due to the potential of fuel cells, i.e., devices for the electrochemical conversion of electrochemically oxidizable fuels such hydrogen, mixtures of hydrogen and carbon monoxide, and the like, to electricity, to play a greatly expanded role for general applications including main power units (MPUs) and auxiliary power units (APUs). Fuel cells also can be used for specialized applications, for example, as on-board electrical generating devices for electric vehicles, backup power sources for residential-use devices, main power sources for leisure-use, outdoor and other power-consuming devices in out-of-grid locations, and lighter weight, higher power density, ambient temperature-independent replacements for portable battery packs.

Because large scale, economic production of hydrogen, infrastructure required for its distribution, and practical means for its storage (especially as a transportation fuel) are widely believed to be a long way off, much current research and development has been directed to improving both fuel reformers as sources of electrochemically oxidizable fuels, notably mixtures of hydrogen and carbon monoxide, and fuel cell assemblies, commonly referred to as fuel cell "stacks," as convertors of such fuels to electricity, and the integration of fuel reformers and fuel cells into more compact, reliable and efficient devices for the production of electrical energy.

SUMMARY OF THE INVENTION

In accordance with the present disclosure, there is provided a multi-tubular chemical reactor comprising a plurality of spaced-apart reactor units, each reactor unit comprising an elongate tube having a wall with internal and external surfaces, an inlet at one end and an outlet at the opposing end, the wall enclosing a gaseous flow passageway at least a portion of which defines a gas phase reaction zone, the multi-tubular chemical reactor can include at least one igniter for initiation of a gas phase exothermic reaction within a gas phase reaction zone of a reactor unit. The igniter can include a radiant heat-producing element positioned in thermal communication with and proximity to, but in physical isolation from, the gas phase reaction zone.

With respect to the plurality of spaced-apart reactor units, the maximum distance between adjacent reactor units can be that distance beyond which a gas phase exothermic reaction fails to be initiated in an adjacent reactor unit by the heat from a gas phase exothermic reaction in an operating reactor unit and/or during a steady-state mode of operation, the temperature of the plurality of spaced-apart reactor units falls below a predetermined minimum array temperature. The minimum distance between adjacent reactor units can be that distance below which the temperature at an outlet of a reactor unit is greater than a predetermined maximum temperature.

The multi-tubular chemical reactor can include at least one thermocouple disposed within a chamber comprising the plurality of spaced-apart reactor units.

The multi-tubular chemical reactor can include a plurality of igniters. At least one igniter can be disposed at one end of a chamber comprising the plurality of spaced-apart reactor units and at least one igniter being disposed at the opposite end of the chamber. The multi-tubular chemical reactor can include a plurality of igniters and a plurality of thermocouples disposed within a chamber comprising the plurality of spaced-apart reactor units. At least one igniter and at least one thermocouple can be disposed at one end of the chamber and at least one igniter and at least one thermocouple can be disposed at the opposite end of the chamber.

The plurality of igniters and the plurality of thermocouples can be disposed within the chamber such that at least one igniter at one end of the chamber can be opposite a thermocouple at the opposite end of the chamber.

The multi-tubular chemical reactor can include a source of gaseous reactants, the source of gaseous reactants in fluid communication with the gas phase reaction zone(s) of the reactor unit(s).

The multi-tubular chemical reactor can include a controller for controlling the operation of the multi-tubular chemical reactor. The controller can be in operative communication with the at least one igniter, and if present, at least one of the at least one thermocouple and the source of gaseous reactants.

In accordance with the present disclosure, there is provided a method of carrying out gas phase reforming exothermic reaction(s) within a multi-tubular chemical reactor to produce desired product(s). The method generally includes introducing gaseous reactants into a reactor unit; initiating with radiant heat exothermic reforming reaction(s) of the gaseous reactants within a gas phase reaction zone of the reactor unit, thereby commencing the production of desired product(s); and transferring heat produced by the exothermic reaction occurring within the gas phase reaction zone of the reactor unit to the gas phase reaction zone or one or more adjacent reactor units, thereby initiating an exothermic reaction within at least one adjacent reactor unit until in such manner an exothermic reaction has been initiated in each of the plurality of spaced-apart reactor units. The reactor unit can include a plurality of spaced-apart reactor units, each reactor unit can include an elongate tube having a wall with internal and external surfaces, an inlet at one end and an outlet at the opposing end, the wall enclosing a gaseous flow passageway at least a portion of which defines a gas phase reaction zone.

The methods can include maintaining the exothermic reactions in the plurality of spaced-apart reactor units.

Maintaining the exothermic reactions can include introducing gaseous reactants into each reactor unit of the plurality of spaced-apart reactor units.

The exothermic reaction can be partial oxidation.

In some methods, initiating with radiant heat an exothermic reaction comprises initiating at least one igniter comprising a radiant heat-producing element. The radiant heat-producing element can be positioned in thermal communication with and proximity to, but in physical isolation from, the gas phase reaction zone.

In accordance with the present disclosure, there is provided a multi-tubular chemical reactor comprising:

(a) a plurality of spaced-apart reactor units, each reactor unit comprising an elongate tube having a wall with internal and external surfaces, an inlet at one end and an outlet at the opposing end, the wall enclosing a gaseous flow passageway at least a portion of which defines a gas phase reaction zone; and, (b) at least one igniter for the initiation of gas phase exothermic reaction within the gas phase reaction zones of the reactor units, the igniter including a radiant heat-producing element positioned in proximity to, but in physical isolation from, exposed sections of reactor units. The reactor units can be disposed within a chamber. Operation of the igniter can transmit radiant heat to an exposed section of at least one reactor unit in proximity thereto to initiate gas phase exothermic reaction within the gas phase reaction zone thereof. Radiant heat produced by exothermic reaction occurring within the reaction zone of the at least one reactor unit in turn can initiate exothermic reaction within at least one other reactor unit, optionally within a chamber, until in such manner exothermic reaction has been initiated in all of the reactor units.

The igniter component of the multi-tubular gas phase chemical reactor, physically isolated as it can be from the exposed sections of reactor units within the chamber, provides several benefits and advantages for the management of reactor operation. Depending on the number and arrangement of tubular reactor units, a single igniter unit, and at most only a few igniter units, can often suffice to initiate, or light-off, exothermic gas phase reaction within the gas phase reaction zones of the reactor units. This simplifies both the construction of the reactor and its individual tubular reactor units, the operation of the reactor and the identification and replacement of an inoperative or defective igniter should such be required.

Another major advantage of the igniter component of the reactor herein is the ease with which it can be deactivated once steady-state operation of the reactor is achieved and reactivated to once again initiate exothermic gas phase reaction as the management of the reactor operations require. The facility of activating and deactivating the igniter can be a benefit for multi-tubular reactors that in their normal functioning may undergo frequent and rapid on-off cycles.

BRIEF DESCRIPTION OF THE DRAWINGS

It should be understood that the drawings described below are for illustration purposes only. The drawings are not necessarily to scale, with emphasis generally being placed upon illustrating the principles of the present teachings. The drawings are not intended to limit the scope of the present teachings in any way. Like numerals generally refer to like parts.

DETAILED DESCRIPTION OF THE INVENTION

Figure 1:
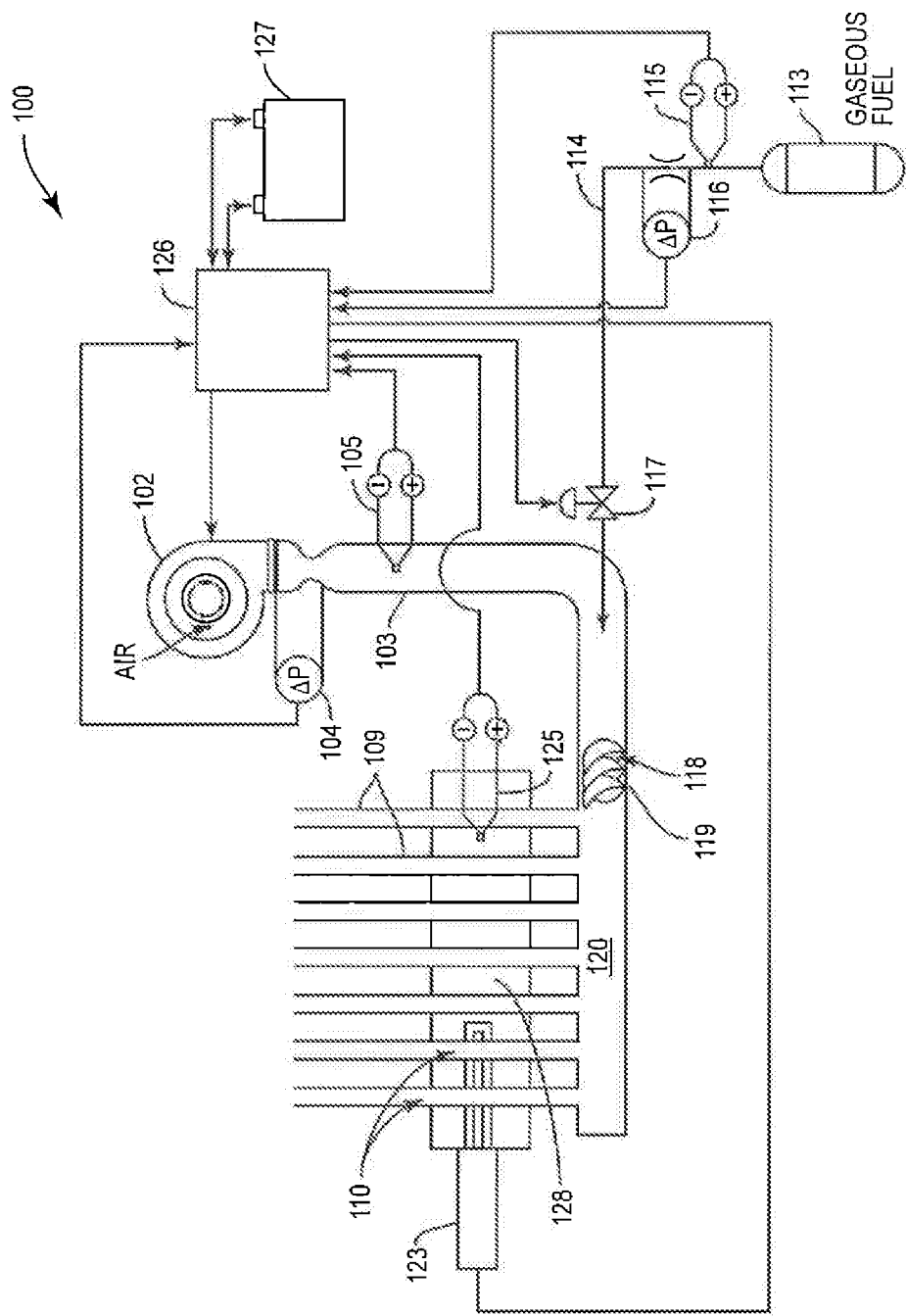
FIG. 1 is schematic block diagram of an embodiment of gas phase exothermic chemical reactor, specifically, a gaseous fuel CPOX reformer, in accordance with the present teachings.

It is to be understood that although the present description is described as applying to a CPOX reformer, the present disclosure applies to all exothermic reformers and/or reactions.

It is to be understood that the present teachings herein are not limited to the particular procedures, materials and modifications described and as such can vary. It is also to be understood that the terminology used is for purposes of describing particular embodiments only and is not intended to limit the scope of the present teachings which will be limited only by the appended claims.

For brevity, the discussion and description herein will mainly focus on partial oxidation reforming reactions and reactants including catalytic partial oxidation reforming reactions and reactants (a reformable fuel and an oxygen-containing gas). However, the devices, assemblies, systems and methods described herein can apply to other exothermic reforming reactions such as autothermal reforming and reactants (a reformable fuel, steam and an oxygen-containing gas) as well as other gas phase exothermic reactions described herein. Accordingly, where an oxygen-containing gas is referenced herein in connection with a device or method, the present teachings should be considered as including steam in combination with an oxygen-containing gas unless explicitly stated otherwise or understood by the context. In addition, where a reformable fuel is referenced herein in connection with a device or method, the present teachings should be considered as including steam in combination or alone, i.e., a reformable fuel and/or steam, unless explicitly stated otherwise or as understood by the context.

In addition, the reactors, systems and methods of the present teachings should be understood to be suitable to carry out CPOX reforming and autothermal reforming, for example, occurring within the same structure and components and/or with the same general methods as described herein. That is, the reactors, systems and methods of the present teachings can deliver the appropriate liquid reactants, for example, liquid reformable fuel and/or liquid water, from a liquid reformable fuel reservoir to a vaporizer to create a vaporized liquid reformable fuel and steam, respectively, and the appropriate gaseous reactants, for example, at least one of an oxygen-containing gas, a gaseous reformable fuel and steam, from their respective sources to a desired component of a fuel cell unit or system for example, a reformer.

Where water is used in the delivery system, recycled heat from one or more of a reformer, a fuel cell stack and an afterburner of a fuel cell unit or system can be used to vaporize the water to create steam, which can be present in the delivery system and/or introduced into the delivery system from an independent source.

Throughout the specification and claims, where structures, devices, apparatus, compositions, etc., are described as having, including or comprising specific components, or where methods are described as having, including or comprising specific method steps, it is contemplated that such structures, devices, apparatus, compositions, etc., also consist essentially of, or consist of, the recited components and that such methods also consist essentially of, or consist of, the recited method steps.

In the specification and claims, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a structure, device, apparatus or composition, or a method described herein, can be combined in a variety of ways without departing from the focus and scope of the present teachings whether explicit or implicit therein. For example, where reference is made to a particular structure, that structure can be used in various embodiments of the apparatus and/or method of the present teachings.

The use of the terms "include," "includes," "including," "have," "has," "having," "contain," "contains," or "containing," including grammatical equivalents thereof, should be generally understood as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. For example, the methods described herein can be performed in any suitable order unless otherwise indicated herein or otherwise clearly contradicted by context. Moreover, unless steps by their nature must be conducted in sequence, they can be conducted simultaneously.

At various places in the present specification, numerical values are disclosed as ranges of values. It is specifically intended that a range of numerical values disclosed herein include each and every value within the range and any subrange thereof. For example, a numerical value within the range of from 0 to 20 is specifically intended to individually disclose 0, 1, 2, 3, 4, 5, 6, 7, 8, 9, 10, 11, 12, 13, 14, 15, 16, 17, 18, 19 and 20 and any subrange thereof, for example, from 0 to 10, from 8 to 16, from 16 to 20, etc.

The use of any and all examples, or exemplary language provided herein, for example, "such as," is intended merely to better illuminate the present teachings and does not pose a limitation on the scope of the invention unless claimed. No language in the specification should be construed as indicating any non-claimed element as essential to the practice of the present teachings.

Terms and expressions indicating spatial orientation or attitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of reactors of the present teachings illustrated in certain of the accompanying figures.

As used herein, a "reformable fuel" refers to a liquid reformable fuel and/or a gaseous reformable fuel.

The expression "gaseous reformable fuel" shall be understood to include reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, and ammonia, and the like, that when subjected to reforming undergo conversion to hydrogen-rich reformates.

The expression "liquid reformable fuel" shall be understood to include reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

As used herein, "gaseous reforming reaction mixture" refers to a mixture including a gaseous liquid reformable fuel (e.g., a vaporized liquid reformable fuel), a gaseous reformable fuel or combinations thereof, and an oxygen-containing gas (e.g., air) and/or water (e.g., in the form of steam) in the case of autothermal reforming. A gaseous reforming reaction mixture can be subjected to a reforming reaction to create a hydrogen-rich product ("reformate"), which also can contain carbon monoxide. Where a catalytic partial oxidation reforming reaction is to be carried out, the gaseous reforming reaction mixture can be referred to a "gaseous CPOX reforming reaction mixture," which includes a reformable fuel and an oxygen-containing gas. Where an autothermal reforming reaction is to be carried out, the gaseous reforming reaction mixture can be referred to as a "gaseous AT reforming reaction mixture," which includes a reformable fuel, an oxygen-containing gas and steam.

The term "reforming reaction" shall be understood to include the exothermic reaction(s) that occur during the conversion of a gaseous reaction medium to a hydrogen-rich reformate. The expression "reforming reaction" herein therefore includes, for example, CPOX and autothermal reforming.

Again, as stated previously for brevity, the discussion and description herein will focus on partial oxidation reforming reactions and reactants including catalytic partial oxidation reforming reactions and reactants (a reformable fuel and an oxygen-containing gas). However, the devices, assemblies, systems and methods described herein can equally apply to other reforming reactions such as autothermal reforming and their respective reactants. For example, for autothermal reforming, steam can be introduced along with an oxygen-containing gas and/or a reformable fuel in the description herein.

The gas phase reactor of the disclosure will now be specifically described in detail in connection with the embodiments of exemplary gaseous fuel CPOX reformers of FIGS. 1, 2, 3 and 4A-4D, and exemplary liquid fuel CPOX reformer of FIGS. 5 and 6.

Figure 2:
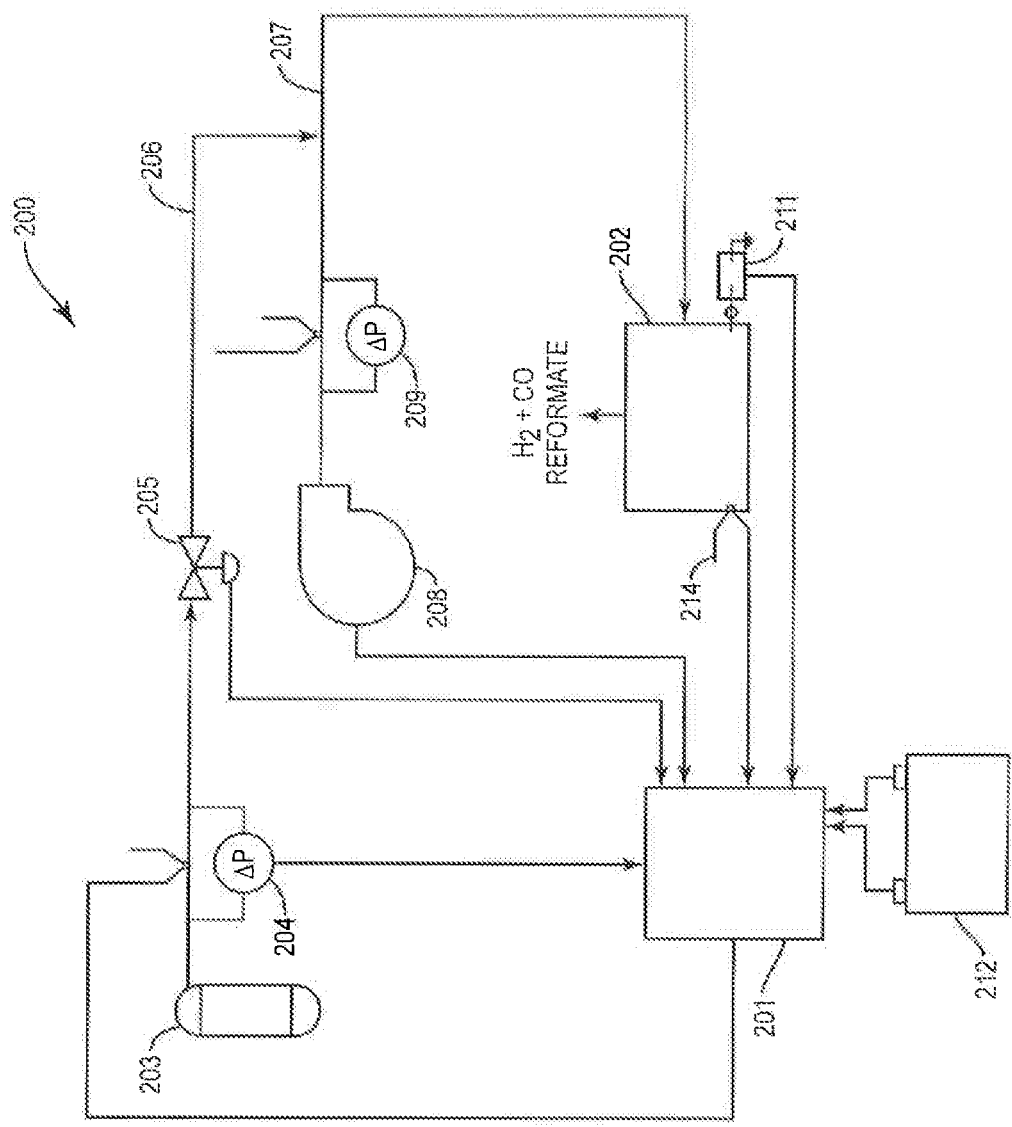
FIG. 2 is a schematic block diagram of an exemplary control system for managing the operation of the gaseous fuel CPOX reformer of FIG. 1.
Figure 3:
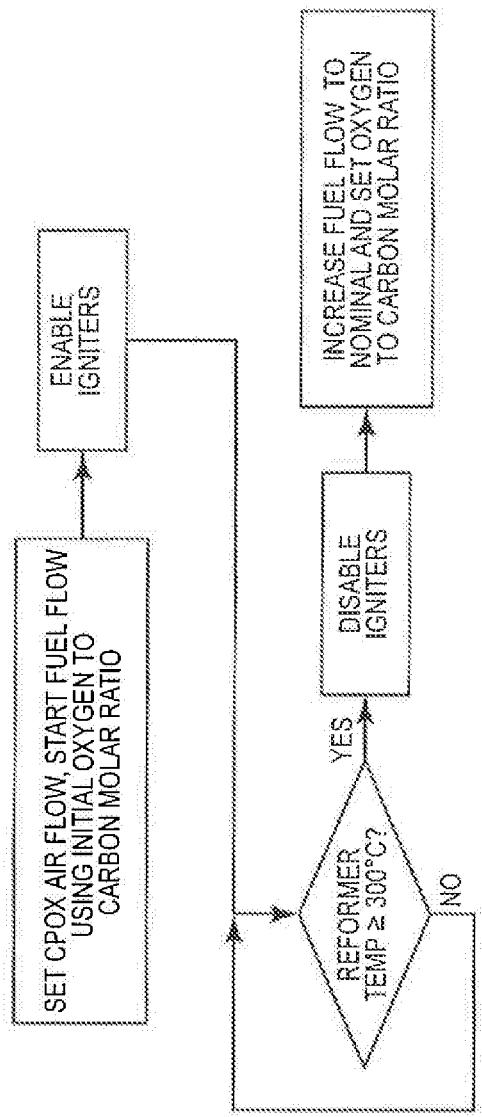
FIG. 3 is a flowchart of an exemplary control routine executed by a controller such as the control system illustrated in FIG. 2.

Gaseous fuel CPOX reformer 100 illustrated in the schematic block diagram of FIG. 1, exemplary control system 200 illustrated in the schematic block diagram of FIG. 2 for managing the operations of reformer 100, the exemplary control routine illustrated in FIG. 3 for execution by control system 200 of FIG. 2 and gaseous fuel CPOX reformer 400 illustrated in FIGS. 4A-4D are of a kind disclosed in benefit U.S. patent application Ser. No. 61/900,543.

As shown in FIG. 1, gaseous fuel CPOX reformer 100 includes centrifugal blower 102 for introducing oxygen-containing gas, exemplified here and in the other embodiments of the present teachings by air, into conduit 103, and for driving this and other gaseous streams (inclusive of gaseous fuel-air mixture(s) and hydrogen-rich reformates) through the various passageways of the CPOX reformer. Conduit 103 can include flow meter 104 and thermocouple 105. These and similar devices can be placed at various locations within a gaseous fuel CPOX reformer in order to measure, monitor and control the operation of the gaseous fuel CPOX reformer as more fully explained in connection with the control system illustrated in FIG. 3.

In a start-up mode of operation of exemplary gaseous fuel CPOX reformer 100, air introduced by blower 102 into conduit 103 combines with gaseous reformable fuel, exemplified here and in the other embodiments of the present teachings by propane, introduced into conduit 103 at a relatively low pressure from gaseous fuel storage tank 113 through fuel line 114 equipped with optional thermocouple 115, flow meter 116 and flow control valve 117. The air and propane combine in mixing zone 118 of conduit 103. A mixer, for example, a static mixer such as in-line mixer 119, and/or vortex-creating helical grooves formed within the internal surface of conduit 103, or an externally powered mixer (not shown), are disposed within mixing zone 118 of conduit 103 to provide a more uniform propane-air gaseous CPOX reaction mixture than would otherwise be the case.

The propane-air mixture (i.e., gaseous CPOX reaction mixture) enters manifold, or plenum, 120 which distributes the reaction mixture to the inlets of tubular CPOX reactor units 109. In a start-up mode of operation of CPOX reformer 100, igniter 123, described in greater detail in connection with gaseous fuel CPOX reformer 400 of FIGS. 4A-4D, initiates the exothermic gaseous phase CPOX reaction of the gaseous CPOX reaction mixture within CPOX reaction zones 110 of tubular CPOX reactor units 109 thereby commencing the production of hydrogen-rich reformate. Once steady-state CPOX reaction temperatures have been achieved (e.g., 150° C. to 1,100° C.), the exothermic reaction becomes self-sustaining and operation of the igniter can be discontinued. Thermocouple 125 is positioned proximate to one or more CPOX reaction zones 110 to monitor the temperature of the CPOX reaction occurring within CPOX reactor units 109, the temperature measurement being relayed as a monitored parameter to reformer control system 126.

Reformer 100 can also include a source of electrical current, for example, rechargeable lithium-ion battery system 127, to provide power for its electrically driven components such as blower 102, flow meters 104 and 116, flow control valve 117 and igniter 123.

If desired, product effluent, for example, hydrogen-rich reformate, from a gaseous fuel CPOX reformer can be introduced into one or more conventional or otherwise known carbon monoxide removal devices for the reduction of its carbon monoxide (CO) content, for example, where the product effluent is to be introduced as fuel to a fuel cell stack utilizing a catalyst that is particularly susceptible to poisoning by CO, for example, a polymer electrolyte membrane fuel cell. Thus, for example, the product effluent can be introduced into a water gas shift (WGS) converter wherein CO is converted to carbon dioxide ($CO_2$) while at the same time producing additional hydrogen, or the product effluent can be introduced into a reactor wherein CO is made to undergo preferential oxidation (PROX) to $CO_2$. CO reduction can also be carried out employing a combination of these processes, for example, WGS followed by PROX and vice versa. It is also within the scope of the present teachings to reduce the level of CO in the product reformate by passage of the product reformate through a known or conventional clean-up unit or device equipped with a hydrogen-selective membrane providing separation of the product reformate into a hydrogen stream and a CO-containing by-product stream. Units/devices of this kind can also be combined with one or more other CO-reduction units such as the aforementioned WGS converter and/or PROX reactor.

Exemplary control system 200 illustrated in FIG. 2 is provided for controlling the operations of a gaseous fuel CPOX reformer in accordance with the present teachings, e.g., reformer 100 of FIG. 1 and reformer 400 of FIGS. 4A-4D. As those skilled in the art will readily recognize, with suitable modification to take into account the operations of the air-preheating and liquid fuel-vaporizing components of liquid fuel CPOX reformer 500 of FIG. 5, control system 200 can also be used for controlling the operations of this type of reformer as well.

As shown in FIG. 2, control system 200 includes controller 201 to manage gaseous fuel CPOX reformer 202 in its start-up, steady-state, and shut-down modes of operation. The controller can be software operating on a processor. However, it is within the scope of the present teachings to employ a controller that is implemented with one or more digital or analog circuits, or combinations thereof.

Control system 200 further includes a plurality of sensor assemblies, for example, thermocouple and associated fuel pressure meter 204, thermocouple and associated air pressure meter 209, and reformer thermocouple 214, in communication with controller 201 and adapted to monitor selected operating parameters of CPOX reformer 202.

In response to input signals from the sensor assemblies, user commands from a user-input device and/or programmed subroutines and command sequences, controller 201 can manage the operations of a gaseous fuel CPOX reformer in accordance with the present teachings. More specifically, controller 201 can communicate with a control signal-receiving portion of the desired section or component of a gaseous fuel CPOX reformer by sending command signals thereto directing a particular action. Thus, for example, in response to flow rate input signals from thermocouple and associated pressure meters 204 and 209 and/or temperature input signals from reformer thermocouple 214, controller 201 can send control signals to fuel flow control valve 205, for example, to control the flow of fuel from gaseous fuel storage tank 203 through fuel line 206 to conduit 207, to centrifugal blower 208 to control the flow of air into conduit 207 and drive the flow of gaseous CPOX reaction mixture within and through CPOX reformer 202, to igniter 211 to control its on-off states, and to battery/battery recharger system 212 to manage its functions.

The sensor assemblies, control signal-receiving devices and communication pathways herein can be of any suitable construction and of those known in the art. The sensor assemblies can include any suitable sensor devices for the operating parameters being monitored. For example, fuel flow rates can be monitored with any suitable flow meter, pressures can be monitored with any suitable pressure-sensing or pressure-regulating device, and the like. The sensor assemblies can also, but do not necessarily, include a transducer in communication with the controller. The communication pathways will ordinarily be wired electrical signals but any other suitable form of communication pathway can also be employed.

In FIG. 2, communication pathways are schematically illustrated as single- or double-headed arrows. An arrow terminating at controller 201 schematically represents an input signal such as the value of a measured flow rate or measured temperature. An arrow extending from controller 201 schematically represents a control signal sent to direct a responsive action from the component at which the arrow terminates. Dual-headed pathways schematically represent that controller 201 not only sends command signals to corresponding components of CPOX reformer 202 to provide a determined responsive action, but also receives operating inputs from CPOX reformer 202 and mechanical units such as fuel control valve 205 and blower 208 and measurement inputs from sensor assemblies such as pressure meters 204 and 209 and thermocouple 214.

FIG. 3 presents a flow chart of an exemplary control routine that can be executed by a controller of a control system to automate the operations of a gaseous fuel CPOX reformer, e.g., reformer 100 of FIG. 1 and reformer 400 of FIGS. 4A-4D. The flow chart can be executed by a controller at a fixed interval, for example, every 10 milliseconds or so. The control logic illustrated in FIG. 3 performs several functions including the management of gaseous flows and CPOX reaction temperatures in start-up and steady-state modes of operation and management of the procedure for the shut-down mode of reformer operation.

As shown in the various views of exemplary gaseous fuel CPOX reformer 400 and components thereof illustrated in FIGS. 4A-4D, which are representative of further embodiments of the present teachings, air as an oxygen-containing gas, typically at ambient temperature, is introduced at a preset mass flow rate via centrifugal blower 402 through inlet 403 of conduit 404. Propane is introduced into conduit 404 via fuel line 441 and fuel inlet 442. Propane and air begin to combine in mixing zone 420 of conduit 404 to provide a gaseous CPOX reaction mixture. A mixer of any suitable kind, for example, a static mixer disposed within mixing zone 420 and/or a helically-grooved internal wall surface of conduit 404, can be included to provide a gaseous CPOX reaction mixture of greater compositional uniformity than otherwise would form in mixing zone 420.

Following its passage through the optional static mixer and/or contact with helical grooves disposed within mixing zone 420, gaseous CPOX reaction mixture exits conduit 404 through outlet 425 and into fuel distribution manifold 426. From manifold 426, gaseous CPOX reaction mixture enters inlets 431 of CPOX reactor units 408 and into CPOX reaction zones 409 where the reaction mixture undergoes exothermic gas phase CPOX reaction to produce a hydrogen-rich, carbon monoxide-containing reformate. In the start-up mode, one or more igniters 435 initiates CPOX. After CPOX becomes self-sustaining, for example, when the temperature of the reaction zone reaches from about 250° C. to about 1100° C., igniter(s) 435 can be shut off as external ignition is no longer required to maintain the now self-sustaining exothermic CPOX reaction. Thermal insulation 410, for example, of the microporous or alumina-based refractory type, surrounds those portions of CPOX reformer 400 to reduce thermal losses from these components.

Figure 4A:
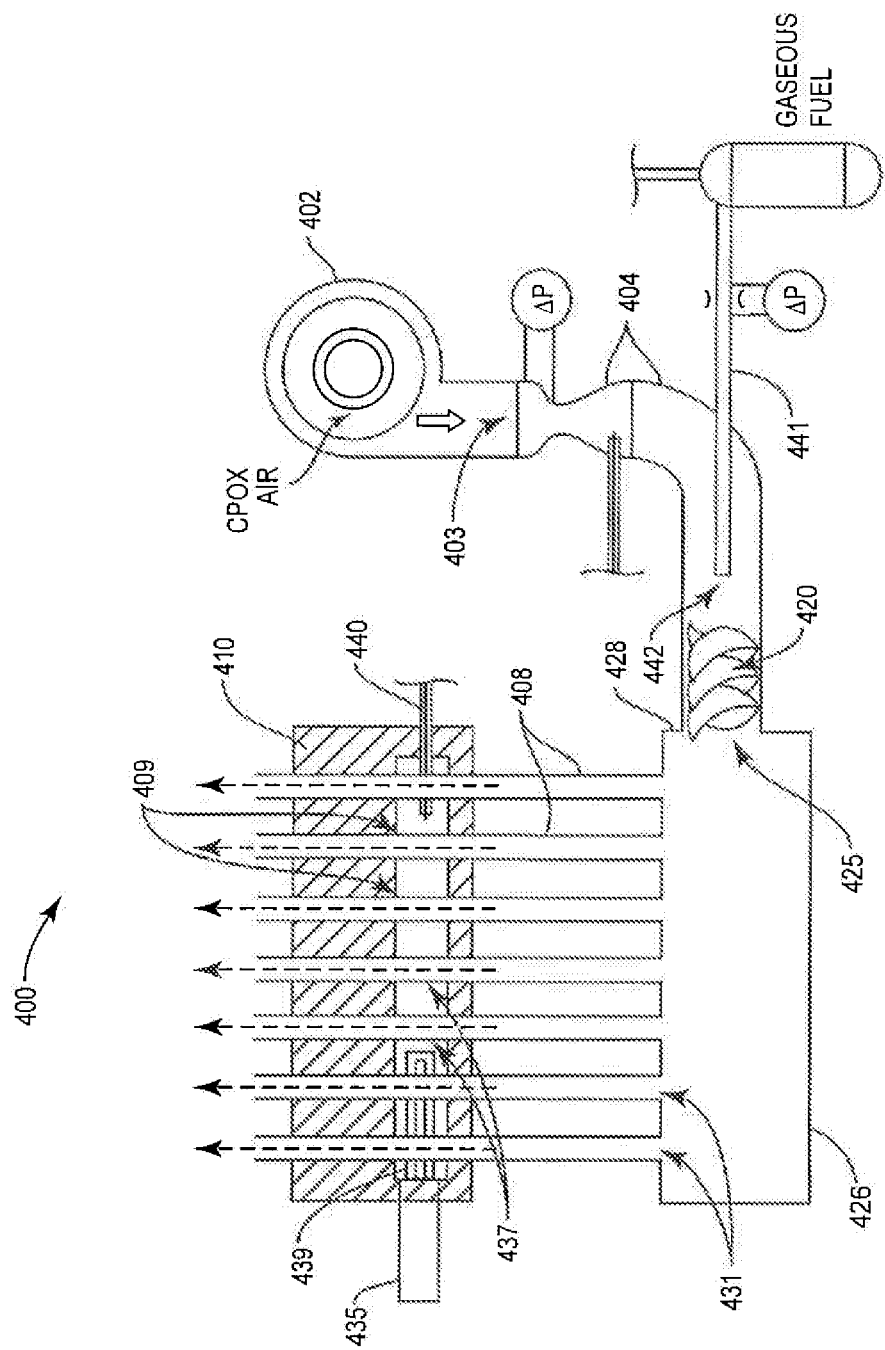
FIG. 4A is a longitudinal cross section view of an embodiment of a gaseous fuel CPOX reformer in accordance with the present teachings.
Figure 4B:
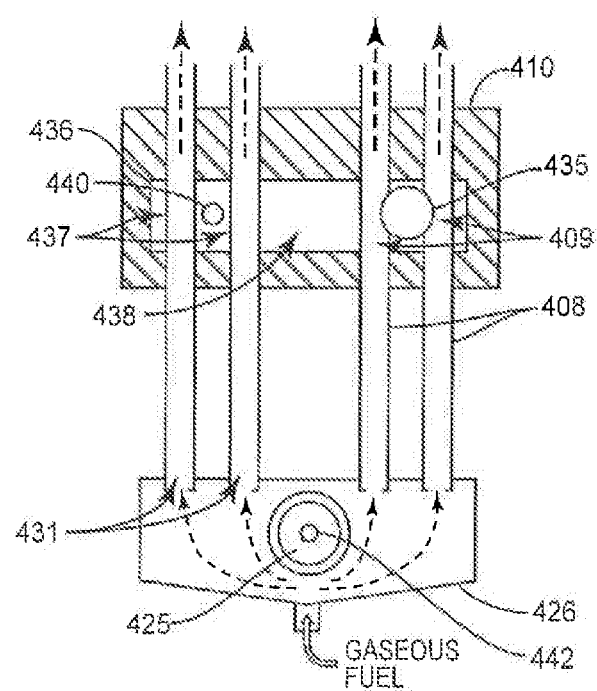
FIG. 4B is a lateral (perpendicular to the longitudinal axis) cross section view of the gaseous fuel CPOX reformer illustrated in FIG. 4A.
Figure 4C:
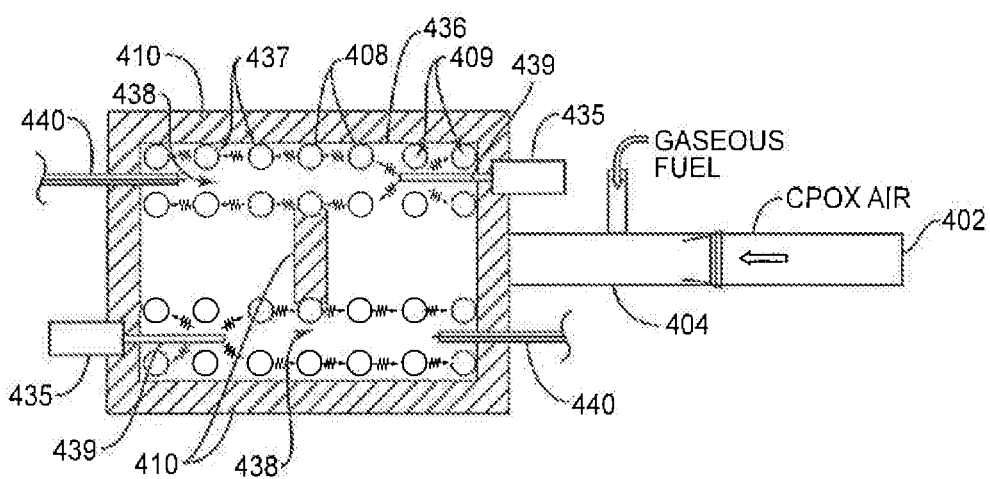
FIG. 4C is a plan cross section view of a portion of the gaseous fuel CPOX reformer illustrated in FIG. 4A.
Figure 4D:
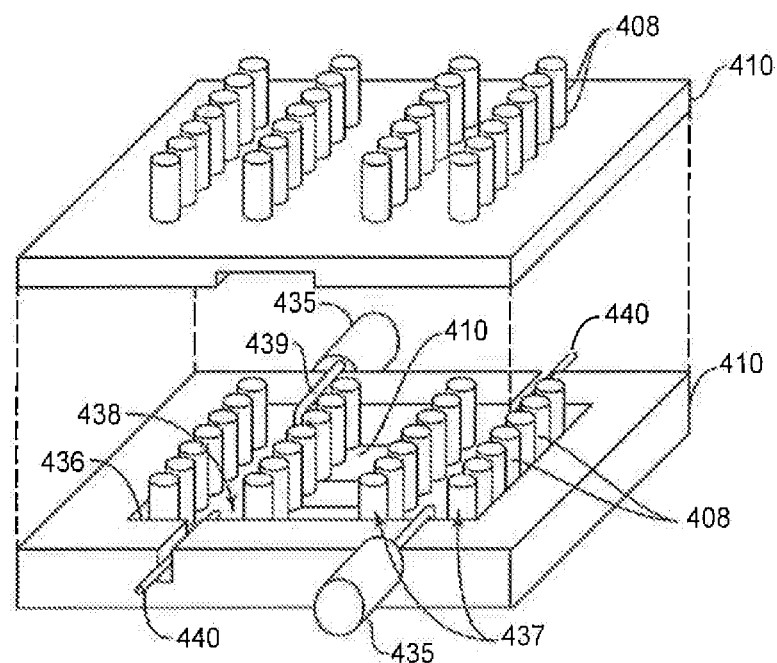
FIG. 4D is a perspective view of a portion of the gaseous fuel CPOX reformer illustrated in FIG. 4A.

FIGS. 4A-4D illustrate an embodiment of the present teachings where two igniters 435 (one for each separate array of CPOX reactor units 408) are used to initiate CPOX reaction within exothermic CPOX reaction zones 409 of CPOX reactor units 408 disposed within and/or extending through chamber 436 during the start-up mode of operation of reformer 400. As shown in FIGS. 4C and 4D, CPOX reactor units 408 are arranged in two separate 2×7 parallel arrays with each array being disposed within chamber 436, one such array flanking one side of conduit 404 and the other such array flanking the other side of conduit 404. The perimeter of an array marks the boundary between open space 438 of chamber 436 and thermal insulation 410. Exterior surfaces 437 of the walls of CPOX reactor units 408 corresponding to at least a portion of their CPOX reaction zones 409 are exposed within open space 438. Igniters 435 of the electrical resistance type, for example, rated at from 10 to 80 watts or greater, are disposed at opposing ends of chamber 436 where their radiant heat-producing elements 439 are positioned in proximity to, but in physical isolation from, exterior surfaces 437 of CPOX reactor units 408. Thermocouples 440 are disposed at the ends of chamber 436 opposing igniters 435 in order to monitor the temperature of CPOX reaction zones 409 and provide a reformer control input as described in connection with control system 200 illustrated in FIG. 2. Operation of the igniters causes radiant heat to be transferred to, and through, the walls of one or more nearby CPOX reactor units whereby CPOX is initiated within the CPOX reaction zone of such reactor unit(s). The thermal radiation emitted from the CPOX reaction zone(s) of these nearby CPOX reactor units can then initiate CPOX within the reaction zones of the remaining CPOX reactor units within the array as illustrated by the wavy arrows in FIG. 4C.

The provision of a single, or at most a few, igniter(s) 435 that avoid direct contact with CPOX reactor units 408 provides several advantages over a CPOX igniter system in which each CPOX reactor unit has its own physically attached or integrated igniter. Identification of an inoperative igniter can be problematic and its removal and replacement without damage to the CPOX reactor unit of which it is a part and/or disturbance to other reactor units in the array can be difficult. Accordingly, a single or just a few igniters appropriately positioned within an array or plurality of CPOX reactor units can permit easy and simple identification and extraction from CPOX reformer 400 of a failed or defective igniter, and its replacement with an operative igniter.

As shown in FIGS. 4C and 4D where two igniters are used to initiate the CPOX reaction within CPOX reaction zones 409 of CPOX reactor units 408, it can be advantageous to reverse the positions of igniter 435 and thermocouple 440 on one side of chamber 436 relative to the positions of igniter 435 and thermocouple 440 on the other side of the chamber, particularly where there can be significant thermal communication between the two chambers. Such an arrangement has been observed to result in a more rapid initiation of CPOX within the CPOX reaction zones of each separate array of CPOX reactor units. However, it should be understood that with appropriately dimensioned and positioned CPOX reactor units within a chamber, a single igniter can be used to initiate CPOX within the CPOX reaction zones of the CPOX reactor units within the chamber.

As those skilled in the art will readily recognize and appreciate, the cross sectional configuration, number and dimensions of CPOX reactor units and the distances of their separation from each other measured from their geometric centers, or centroids, will be made to depend on the operational and mechanical performance specifications for a particular gaseous fuel CPOX reactor. In the case of a CPOX reactor unit of substantially uniform circular cross section, for example, CPOX reactor unit 408 illustrated in FIGS. 4C and 4D, the number of such CPOX reactor units, their length and their internal and external diameters (defining the thickness of their gas-permeable walls) the gas-permeable walls will be determined by, among other things, the hydrogen-producing capacity of the CPOX reformer, which in turn is a function of several factors including the type, amount (loading and distribution of CPOX catalyst within the gas-permeable walls), the characteristics of the porous structure of walls (characteristics influencing the gas-permeability of the walls and therefore affecting the CPOX reaction) such as pore volume (a function of pore size), the principal type of pore (mostly open, i.e., reticulated, or mostly closed, i.e., non-reticulated), and pore shape (spherical or irregular), the volumetric flow rates of CPOX reaction mixture, CPOX temperature, back pressure, and the like.

The desired mechanical performance characteristics of a particular gaseous fuel CPOX reformer will depend to a considerable extent on such factors as the thermal and mechanical properties of the material used for construction of the CPOX reactor units, the volume and morphology of the pores of the gas-permeable structure of the walls of the CPOX reactor units, the dimensions of the reactor units, particularly wall thickness, and related factors.

For a gaseous fuel CPOX reformer to suitably function, the gas permeability property of the catalytically active wall structure of a tubular CPOX reactor unit enclosing a gaseous phase CPOX reaction zone should be such as to allow gaseous reformable fuel to enter freely and diffuse through such wall structure thereby making effective contact not only with surface CPOX catalyst but interior CPOX catalyst as well, if present. It should be noted that CPOX reactor unit wall structures having limited gas permeability for the vaporized reformable fuel can be mass transport limited so as to impede significantly CPOX conversion of the gaseous reformable fuel to hydrogen-rich reformate. By contrast, catalytically active reactor wall structures of suitable gas permeability promote CPOX conversion of the gaseous reformable fuel and selectivity for hydrogen-rich reformates of desirable composition.

Guided by the present teachings and employing known and conventional testing procedures, those skilled in the art can readily construct CPOX reactor units having catalytically active wall structures exhibiting optimal gas permeability properties for a particular gaseous reformable fuel to be processed.

Materials from which the catalytically active wall structure of a CPOX reaction zone of a tubular CPOX reactor unit can be fabricated are those that enable such wall structures to remain stable under the high temperatures and oxidative environments characteristic of CPOX reactions. Conventional and otherwise known refractory metals, refractory ceramics, and combinations thereof can be used for the construction of the catalytically active wall structure of a CPOX reaction zone. Some of these materials, for example, perovskites, can also possess catalytic activity for partial oxidation and therefore can be useful not only for the fabrication of the catalytically active wall structure of a CPOX reaction zone but can also supply part or even all of the CPOX catalyst for such structure.

Among the useful refractory metals are titanium, vanadium, chromium, zirconium, molybdenum, rhodium, tungsten, nickel, iron and the like, their combinations with each other and/or with other metals and/or metal alloys, and the like. Refractory ceramics are an especially attractive class of materials for the construction of the catalytically active wall structures due to their relatively low cost compared to many of the refractory metals and metal alloys that are also useful for this purpose. The comparative ease with which such ceramics can be formed into tubular gas-permeable structures of fairly reproducible pore type employing known and conventional pore-forming procedures and the generally highly satisfactory structural/mechanical properties of ceramics (including coefficients of thermal expansion and thermal shock performance) and resistance to chemical degradation make them particularly advantageous materials. Suitable refractory ceramics for the construction of a CPOX reaction zone (which as previously stated, can include the entire wall structure of a CPOX reactor unit) include, for example, perovskites, spinels, magnesia, ceria, stabilized ceria, silica, titania, zirconia, stabilized zirconia such as alumina-stabilized zirconia, calcia-stabilized zirconia, ceria-stabilized zirconia, magnesia-stabilized zirconia, lanthana-stabilized zirconia and yttria-stabilized zirconia, zirconia stabilized alumina, pyrochlores, brownmillerites, zirconium phosphate, silicon carbide, yttrium aluminum garnet, alumina, alpha-alumina, gamma-alumina, beta-alumina, aluminum silicate, cordierite, $MgAl_2O_4$, and the like, various ones of which are disclosed in U.S. Pat. Nos. 6,402,989 and 7,070,752, the entire contents of which are incorporated by reference herein; and, rare earth aluminates and rare earth gallates various ones of which are disclosed in U.S. Pat. Nos. 7,001,867 and 7,888,278, the entire contents of which are incorporated by reference herein.

In general, the total or overall fuel conversion capacity of a CPOX reformer of a given design will be the sum of the fuel conversion capabilities of its individual CPOX reactor units. The minimum distance between adjacent CPOX reactor units will be such that in the steady-state mode of operation of the reformer, the temperature of the reactor units does not exceed a predetermined, or preset, maximum, and the maximum distance between adjacent CPOX reactor units is that distance beyond which the CPOX reaction fails to be initiated within one or more reactor units during a start-up mode of operation of the gaseous fuel CPOX reformer or the temperature within one or more CPOX reactor units falls below a predetermined, or preset, minimum intended for the steady-state mode of operation of the reformer. Within the above principles as guidance, the minimum and maximum distances between adjacent CPOX reactor units can be determined for a given reformer design employing routine testing methods.

More specifically, the maximum distance between adjacent CPOX reactor units can be that distance beyond which a CPOX reaction fails to be initiated within an adjacent CPOX reactor unit by the heat generated from an initial CPOX reaction (e.g., an initial CPOX reaction initiated by an igniter) in a first-ignited CPOX reactor unit or from a CPOX reaction in an operating CPOX reactor unit. The maximum distance can be that distance beyond which, during a steady-state mode of operation, the temperature of the array of spaced-apart CPOX reactor units falls below a predetermined minimum array temperature. Depending on various factors, including those discussed herein, the predetermined minimum array temperature of an array of spaced-apart CPOX reactor units during steady-state mode of operation can be about 550° C., about 575° C., about 600° C., about 625° C., about 650° C., about 675° C., about 700° C., about 725° C., about 750° C., about 775° C., about 800° C., about 825° C., or about 850° C.

The minimum distance between adjacent CPOX reactor units can be that distance below which the temperature at an outlet of a CPOX reactor unit is greater than a predetermined maximum temperature. The predetermined maximum temperature can be a temperature that is tolerable by an inlet of a fuel cell stack in thermal and fluid communication with an outlet of a CPOX reactor unit, for example, a temperature at which the seals of the inlets of the fuel cell stack do not degrade and remain functional. Depending on various factors, including those discussed herein, the predetermined maximum temperature of a CPOX reactor unit can be about 775° C., about 800° C., about 825° C., about 850° C., about 875° C., about 900° C., about 925° C., about 950° C., about 975° C., or about 1000° C.

The present teachings contemplate the use of any of the heretofore known and conventional CPOX catalysts (including catalyst systems), methods of incorporating catalyst within a porous substrate or support, specifically, the gas-permeable wall of the CPOX reactor unit, and patterns of catalyst distribution including, but not limited to, catalyst confined to a particular section of a wall, catalyst loading increased along the length of a reactor unit and/or decreased from an inner surface of a wall to its outer surface, CPOX catalyst that varies in composition along the length of the reactor unit, and similar variants. Thus, for example, increasing catalyst loading within a wall of a CPOX reactor unit from the start of a CPOX reaction zone to, or near, the end thereof can be helpful in maintaining a constant CPOX reaction temperature within this zone.

Among the many known and conventional CPOX catalysts that can be utilized herein are the metals, metal alloys, metal oxides, mixed metal oxides, perovskites, pyrochlores, their mixtures and combinations, including various ones of which are disclosed, for example, in U.S. Pat. Nos. 5,149,156; 5,447,705; 6,379,586; 6,402,989; 6,458,334; 6,488,907; 6,702,960; 6,726,853; 6,878,667; 7,070,752; 7,090,826; 7,328,691; 7,585,810; 7,888,278; 8,062,800; and, 8,241,600, the entire contents of which are incorporated by reference herein.

While numerous highly active noble metal-containing CPOX catalysts are known and as such can be useful herein, they are generally less often employed than other known types of CPOX catalysts due to their high cost, their tendency to sinter at high temperatures and consequently undergo a reduction in catalytic activity, and their proneness to poisoning by sulfur.

Perovskite catalysts are a class of CPOX catalyst useful in the present teachings as they are also suitable for the construction of the catalytically active wall structures of a CPOX reactor unit. Perovskite catalysts are characterized by the structure $ABX_3$ where "A" and "B" are cations of very different sizes and "X" is an anion, generally oxygen, that bonds to both cations. Examples of suitable perovskite CPOX catalysts include $LaNiO_3$, $LaCoO_3$, $LaCrO_3$, $LaFeO_3$ and $LaMnO_3$.

A-site modification of the perovskites generally affects their thermal stability while B-site modification generally affects their catalytic activity. Perovskites can be tailor-modified for particular CPOX reaction conditions by doping at their A and/or B sites. Doping results in the atomic level dispersion of the active dopant within the perovskite lattice thereby inhibiting degradations in their catalytic performance. Perovskites can also exhibit excellent tolerance to sulfur at high temperatures characteristic of CPOX reforming. Examples of doped perovskites useful as CPOX catalysts include $La_{1-x}Ce_xFeO_3$, $LaCr_{1-y}Ru_yO_3$, $La_{1-x}Sr_xAl_{1-y}Ru_yO_3$ and $La_{1-x}Sr_xFeO_3$ wherein x and y are numbers ranging, for example, from 0.01 to 0.5, for example, from 0.05 to 0.2, etc., depending on the solubility limit and cost of the dopants.

Figure 5:
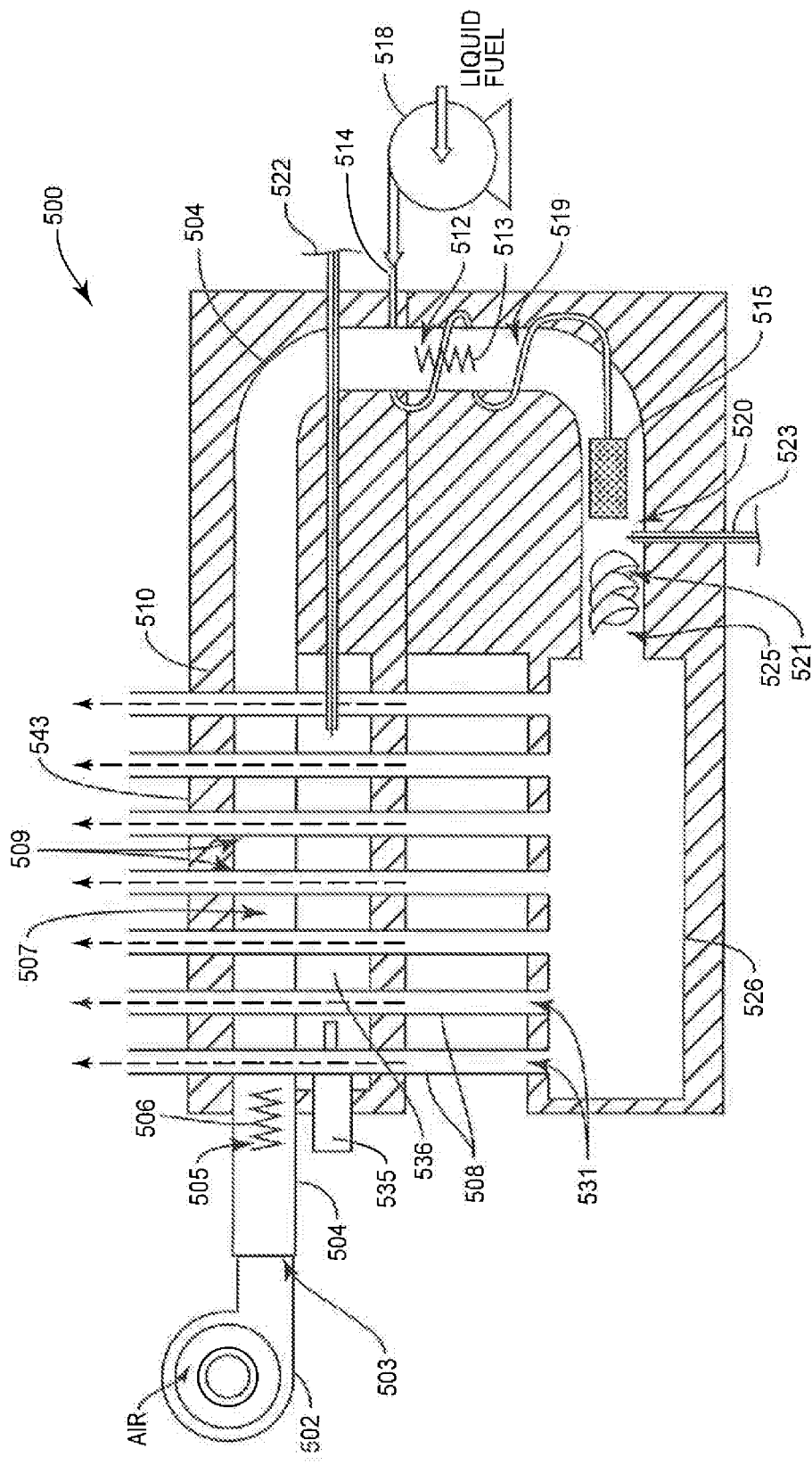
FIG. 5 is a longitudinal cross section view of another embodiment of gas phase chemical reactor, specifically, a liquid fuel CPOX reformer, in accordance with the present teachings.
Figure 6:
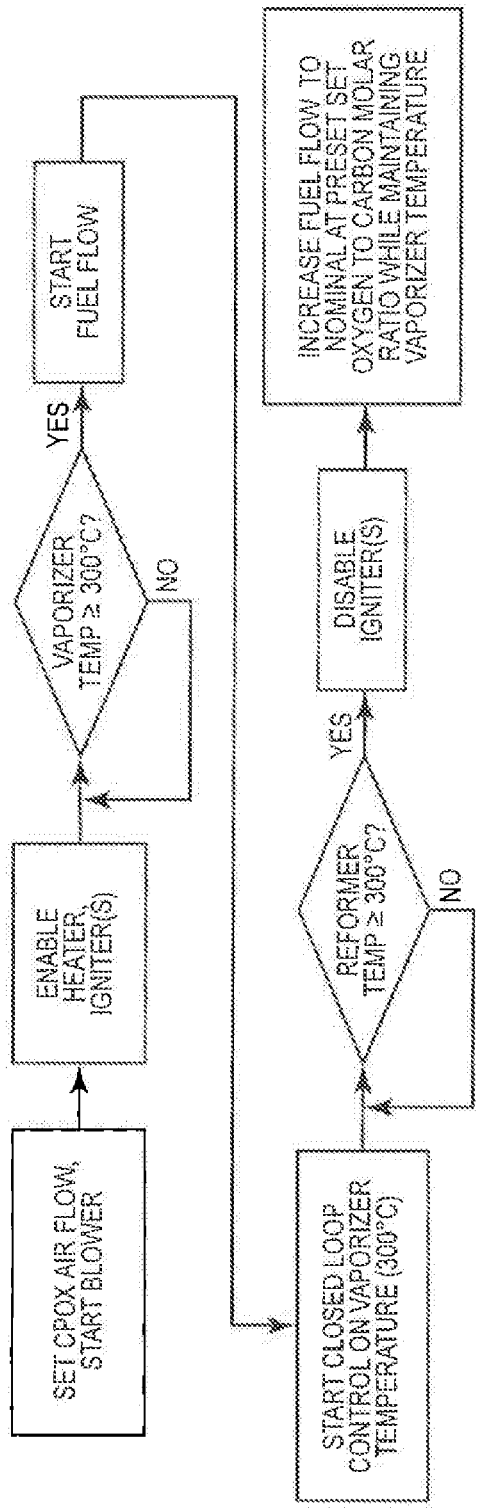
FIG. 6 is a flowchart of an exemplary control routing executed by a controller for managing the operation of the liquid fuel CPOX reformer of FIG. 5.

Liquid fuel CPOX reformer 500 illustrated in FIG. 5 and the exemplary control routine illustrated in FIG. 6 for the automated operation of reformer 500 are of a kind disclosed in benefit U.S. patent application Ser. No. 61/900,510.

As shown in exemplary liquid fuel CPOX reformer 500 of FIG. 5 which is further representative of the present teachings, air as an oxygen-containing gas is introduced at ambient temperature and at a preset mass flow rate via centrifugal blower 502 through inlet 503 of conduit 504, which includes a generally U-shaped conduit section favoring compact design. The ambient temperature air is initially heated in the start-up mode operation of the reformer to within a preset range of elevated temperature by passage through first heating zone 505 supplied with heat from electric heater 506 which can be of a conventional or otherwise known electrical resistance type rated, for example, at from 10 to 80 watts or even greater depending upon designed range of fuel processing capacity of reformer 500. Electrical resistance heaters are capable of raising the temperature of ambient air introduced into a conduit to a desired level for a relatively wide range of CPOX reformer configurations and operating capacities. During the steady-state mode of operation of reformer 500, electric heater 506 can be shut off, the air introduced into conduit 504 then being initially heated within second heating zone 507 by heat of exotherm recovered from CPOX reaction zones 509 of elongate tubular gas-permeable CPOX reactor units 508, for example, of the structure and composition described above in connection with CPOX reactor units 408 of gaseous fuel CPOX reformer 400 of FIGS. 4A-4D. In this manner, the temperature of the air introduced into conduit 504 can be increased from ambient to within some preset elevated range of temperature with the particular temperature being influenced by a variety of design, i.e., structural and operational, factors as those skilled in the art will readily recognize.

As in the case of gaseous fuel CPOX reformer 400 of FIGS. 4A-4D, thermal insulation 510 advantageously surrounds heat-radiating portions of liquid fuel CPOX reformer 500 in order to reduce thermal losses therefrom.

To raise the temperature of the air that had been initially heated by passage through first heating zone 505 in a start-up mode or through second heat zone 507 in a steady-state mode, as the initially heated air continues to flow downstream in conduit 504, it advantageously flows through optional third heating zone 512 supplied with heat from optional second electric heater unit 513. Because optional second electric heater unit 513 need only increase the temperature of the initially heated air by a relatively small extent, it can function as an incremental heater capable of making the typically small adjustments in air temperature that are conducive to precise and rapid thermal management of the reformer both with regard to the functioning of its fuel vaporization system and its tubular CPOX reactor units.

A liquid reformable fuel such as any of those mentioned above, and exemplified in this and the other embodiments of the present teachings by automotive diesel, is introduced via fuel line 514 terminating within conduit 504 in liquid fuel spreader device 515, for example, a wick (as shown) or spray device.

Any conventional or otherwise known pump or equivalent device 518 for passing fluid through the passageways and conduits of a liquid fuel CPOX reformer, for example, for introducing liquid fuel through fuel line 514 into conduit 504, can be used. For example, a metering pump, rotary pump, impeller pump, diaphragm pump, peristaltic pump, positive displacement pump such as a gerotor, gear pump, piezoelectric pump, electrokinetic pump, electroosmotic pump, capillary pump, and the like, can be utilized for this purpose. In some embodiments, pump or equivalent device 518 can deliver the fuel on an intermittent or pulsed flow basis. In certain embodiments, a pump or equivalent device can deliver the fuel as a substantially continuous flow. In particular embodiments, a pump or equivalent device can make rapid adjustments in fuel flow rate in response to changing CPOX reformer operating requirements.

As indicated above, the pressurized liquid fuel can be spread within a conduit by a wick or as a fine spray or otherwise in droplet form by any of such conventional or otherwise known spray devices as fuel injectors, pressurized nozzles, atomizers (including those of the ultrasonic type), nebulizers, and the like.

Heat produced by electric heater 506 within first heating zone 505 in a start-up mode or heat of exotherm recovered from CPOX within second heating zone 507 during a steady-state mode, combined, if desired, with heat produced by optional second electric heater 513 within optional heating zone 512 function in unison to vaporize the liquid fuel introduced into conduit 504 and together constitute the principal components of the fuel vaporizer system of the reformer.

Optional second electric heater 513 operates to not only incrementally raise the temperature of the initially heated ambient temperature air passing within its associated optional third heating zone but can also be used to heat the liquid fuel prior to its introduction into conduit 504 thereby facilitating the vaporization of the fuel once it enters the conduit.

To provide for the heating of the liquid fuel before it enters main conduit 504, fuel line 514 traverses the wall of conduit 504 with section 519 of the fuel line being extended in length to prolong the residence time of fuel flowing therein where the fuel line passes through, or is proximate to, optional third heating zone 512 of main conduit 504. An extended fuel line section can assume a variety of configurations for this purpose, for example, a coiled or helical winding (as shown) or a series of lengthwise folds, disposed on or proximate to the exterior surface of a conduit corresponding to a second heating zone or any similar such configuration disposed within the interior of the conduit at or near the second heating zone. Regardless of its exact configuration and/or disposition, extended fuel line section 519 must be in effective heat transfer proximity to optional third heating zone 512 so as to receive an amount of heat sufficient to raise the temperature of the fuel therein to within some preset range of temperature. Thus, a portion of the thermal output of optional second electric heater 513 within third heating zone 512 of conduit 504, in addition to further heating air flowing within this zone, will transfer to fuel, for example, diesel fuel, flowing within the distal section 519 of fuel line 514, which distal section of fuel line 514 can be lengthened or extended as shown by reference numeral 519, thereby raising its temperature to within the preset range. Whichever range of temperature values is chosen for the fuel within the fuel line, it should not exceed the boiling point of the fuel (from 150° C. to 350° C. in the case of diesel) if vapor lock and consequent shut-down of reformer 500 are to be avoided.

Liquid fuel spreader 515 is disposed within conduit 504 downstream from optional second heating zone 512 and associated optional second electric heater 513 and upstream from mixing zone 520. Thermocouple 522 disposed within chamber 536 and thermocouple 523 is disposed within mixing zone 520 monitor, respectively, the temperatures of CPOX reforming occurring within CPOX reaction zones 509 of CPOX reactor units 508 and the temperature of the vaporized fuel-air mixture.

In the liquid fuel vaporizer systems described herein, there is no or at most little opportunity for the diesel to come into direct contact with a heated surface, for example, that of an electrical resistance heater element, that would pose a risk of raising the temperature of the diesel fuel to or above its flash point, to cause spattering of the fuel rather than its vaporization and/or cause pyrolysis of the fuel resulting in coke formation. Thus, the temperature of the diesel fuel can be readily and reliably maintained at a level below its flash point and without significant incidents of spattering or coking.

Following its passage through static mixer 521 disposed within mixing zone 520, gaseous CPOX reaction mixture exits main conduit 504 through outlet 525 and enters manifold 526. From manifold 526, the gaseous CPOX reaction mixture enters tubular CPOX reactor units 508 through inlets 531. The gaseous CPOX reaction mixture then enters CPOX reaction zones 509 where the mixture undergoes gaseous phase CPOX reaction(s) to produce a hydrogen-rich, carbon monoxide-containing reformate. In the start-up mode, at least one igniter 535, the heat-radiating element of which is disposed within chamber 536, is activated thereupon initiating CPOX. Igniter 535 and its operation are essentially identical to igniter 435 of gaseous fuel CPOX reformer 400 and the latter's operation. After CPOX becomes self-sustaining, for example, when the temperature of reaction zone 509 reaches from about 250° C. to about 1100° C., igniter(s) 535 can be shut off as external ignition is no longer required to maintain the now self-sustaining exothermic CPOX reaction.

Further in accordance with the present teachings, steam can be introduced into the reformer so that the reformer may be operated to carry out autothermal and/or steam reforming reaction(s).

In one embodiment, the reformer can be initially operated to perform CPOX conversion of a liquid or gaseous reformable fuel thereby providing heat of exotherm that, with or without additional heat, for example, supplied by an electric heater, can be recovered to produce steam in a steam generator. The thus-generated steam can be introduced into the reformer in one or more locations therein. One suitable location is the evaporator where the steam can provide heat to vaporize liquid fuel. For example, steam introduced into wick 515 in reformer 500 illustrated in FIG. 5 can provide heat for vaporizing liquid fuel on wick surfaces at the same time helping to eliminate or suppress clogging of such surfaces.

In another embodiment, a reformer in accordance with the present teachings can be connected to a fuel cell stack in which hydrogen-rich reformate from the reformer is converted to electrical current. Operation of the fuel cell stack, and where present an associated afterburner unit, can provide source(s) of waste heat that can be recovered and utilized for the operation of a steam generator, again, with or without additional heat such as that supplied by an electric heater. The steam from the steam generator can then be introduced into the reformer, for example, through wick 515 of reformer 500 of FIG. 5, to support autothermal or steam reforming. In this arrangement of integrated reformer and fuel cell stack, the source(s) of waste heat referred to can supply the necessary heat to drive endothermic reaction(s) that are involved in autothermal and steam reforming processes.

In sum, it should be understood that the delivery systems of the present teachings can deliver the appropriate reactants for carrying out reforming reactions including partial oxidation ("POX") reforming such as catalytic partial oxidation ("CPOX") reforming, steam reforming, and autothermal ("AT") reforming. The liquid reactants such as liquid reformable fuels and water can be delivered from and through the "liquid reformable fuel" delivery components, conduits, and assemblies of the delivery system. The gaseous reactants such as gaseous reformable fuels, steam, and an oxygen-containing gas such as air can be delivered from and through the "gaseous reformable fuel" delivery components, conduits, and assemblies of the delivery system. Certain gaseous reactants such as steam and an oxygen-containing gas can be delivered from and through components and assemblies that are peripheral or secondary to the delivery systems of the present teachings, for example, an oxygen-containing gas can be delivered from a source of oxygen-containing gas that is independently in operable fluid communication with at least one of a vaporizer, a reformer, and a fuel cell stack of a fuel cell unit or system, for example, to mix with a liquid reformable fuel and/or a vaporized liquid reformable fuel prior to reforming.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

The invention claimed is:

1. A method of carrying out a gas phase exothermic reaction within a multi-tubular chemical reactor to produce desired product(s), the method comprising:

introducing gaseous reactants into an inlet of a gaseous flow passageway of a plurality of reactor units, each reactor unit of the plurality comprising an elongate tube having a wall with an internal surface, an external surfaces, and a wall interior between the internal and external surfaces, at least a portion of the wall interior adapted to function as a gas phase reaction zone, the interior surface of the wall enclosing the gaseous flow passageway having the inlet at one end and an outlet at the opposing end, the interior surface of the wall adapted to permit gas flowing through the passageway to enter the wall interior at the gas phase reaction zone;

flowing at least a portion of the gaseous reactants into the gas phase reaction zones of the plurality of reactor units;

initiating with radiant heat an exothermic reaction of the gaseous reactants within the gas phase reaction zone of at least one of the reactor units, thereby commencing the production of desired product(s) and exothermic heat; and transferring heat produced by the exothermic reaction occurring within the gas phase reaction zone of the at least one reactor unit to the gas phase reaction zone of one or more adjacent reactor units, thereby initiating an exothermic reaction within the at least one adjacent reactor unit until in such manner an exothermic reaction has been initiated in each of the plurality of spaced-apart reactor units.

2. The method of claim 1, wherein the initiating of the exothermic reaction in the at least one reactor unit comprises heating the at least one reactor unit with at least one igniter, the igniter comprising a radiant heat-producing element, wherein the radiant heat-producing element is positioned in thermal communication with and proximity to, but in physical isolation from, the gas phase reaction zone.

3. The method of claim 1 comprising maintaining the exothermic reactions in the plurality of spaced-apart reactor units with the exothermic heat of the reactions in the plurality of reactor units.

4. The method of claim 1 wherein the exothermic reaction is catalytic partial oxidation.

5. The method of claim 1, wherein the distance between adjacent reactor units is no more than the distance beyond which the exothermic reaction fails to be initiated in the adjacent reactor unit by the exothermic heat from the at least one adjacent reactor unit in which the exothermic reaction is occurring.

6. The method of claim 1, comprising establishing a predetermined minimum array temperature value, and setting the maximum distance between adjacent reactor units as the distance at which the temperature of the plurality of spaced-apart reactor units falls below the predetermined minimum array temperature value.

7. The method of claim 1, comprising establishing a predetermined maximum temperature value, and setting the minimum distance between adjacent reactor units as the distance below which the temperature at an outlet of the gaseous flow passageway is greater than the predetermined maximum temperature value.

8. The method of claim 1, wherein the exothermic reaction is autothermal reforming.

9. The method of claim 1, wherein the reactor units are within a chamber, and measuring the temperature within the chamber with a thermocouple.

10. The method of claim 1, wherein the exothermic reaction is initiated in multiple reactor units with multiple radiant heat electric igniters.

11. The method of claim 1, wherein a plurality of electric radiant heat igniters, the plurality or reactor units and a plurality of thermocouples are all disposed within an insulated chamber, with one igniter at one end of the chamber opposite a thermocouple at the opposite end of the chamber.

12. The method of claim 1, wherein the reactants of the exothermic reaction are fed into a conduit and mixed together and the mixed reactants are fed from the conduit into the inlet.

13. The method of claim 12, wherein the reactants are gaseous fuel and air and mixing is performed with a static mixer within the conduit.

14. The method of claim 1, comprising using a controller to control the operation of the multi-tubular chemical reactor, the controller in operative communication with at least one electric radiant heat igniter, at least one one thermocouple and a source of the gaseous reactants.

15. The method of claim 1, wherein the gaseous reactants comprise methane, butane, or propane.

16. The method of claim 1, wherein the gaseous reactants comprise vaporized diesel fuel, gasoline or kerosene.

* * * * *